(12) United States Patent
Goodward et al.

(10) Patent No.: US 10,539,993 B2
(45) Date of Patent: Jan. 21, 2020

(54) INTEGRATED ENERGY STORAGE SYSTEMS IN COMPUTING FACILITIES

(71) Applicant: Microsoft Technology Licensing, LLC, Redmond, WA (US)

(72) Inventors: Jennifer Goodward, Oakland, CA (US); Sean James, Olympia, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 15/458,614

(22) Filed: Mar. 14, 2017

(65) Prior Publication Data
US 2018/0267589 A1 Sep. 20, 2018

(51) Int. Cl.
*H02J 3/00* (2006.01)
*G06F 1/30* (2006.01)
*G06Q 50/06* (2012.01)

(52) U.S. Cl.
CPC .............. *G06F 1/30* (2013.01); *G06Q 50/06* (2013.01)

(58) Field of Classification Search
CPC . G06F 1/30; G06F 1/20; G06F 1/3206; G06F 1/324; H02J 9/06; H02J 15/00; H02J 9/04; H02J 9/02; H02J 9/061; Y02E 10/563; Y02E 10/566
See application file for complete search history.

(56) References Cited

U.S. PATENT DOCUMENTS

| | | | | |
|---|---|---|---|---|
| 3,296,451 | A * | 1/1967 | Van Ausdal | H02J 9/066 290/30 R |
| 4,471,233 | A * | 9/1984 | Roberts | H02J 9/062 307/66 |
| 4,508,974 | A * | 4/1985 | Henderson | H02J 9/062 307/66 |
| 5,646,458 | A * | 7/1997 | Bowyer | H02J 9/066 290/4 A |
| 6,204,572 | B1 * | 3/2001 | Liran | H02J 9/066 307/64 |
| 6,239,513 | B1 * | 5/2001 | Dean | H02J 9/066 307/64 |
| 6,285,178 | B1 | 9/2001 | Ball et al. | |
| 7,681,395 | B2 * | 3/2010 | Pinkerton | F02C 6/16 60/646 |
| 8,104,041 | B2 * | 1/2012 | Belady | G06F 11/3409 709/226 |

(Continued)

*Primary Examiner* — Darrin D Dunn
(74) *Attorney, Agent, or Firm* — Liang IP, PLLC (57) ABSTRACT

Techniques for providing backup power to distributed computing systems are disclosed herein. In one embodiment, a method includes receiving, via the computer network, data indicating a power failure of the main power source configured to provide electrical power to the servers. The method also includes instructing, via the computer network, a heating, ventilation, and air conditioning ("HVAC") system to provide emergency power to the servers. The HVAC system includes an air mover having blades and a motor-generator mechanically coupled to the blades of the air mover. The motor-generator includes a motor that is configured to rotate the blades of the air mover and a generator that is configured to convert kinetic energy of the rotating blades of the air mover into electrical energy during a power failure of the main power source and provide the generated electrical energy as the emergency power to the servers.

20 Claims, 8 Drawing Sheets

(56) References Cited

U.S. PATENT DOCUMENTS

| | | | |
|---|---|---|---|
| 8,836,158 B2* | 9/2014 | Cho | H02P 9/04 290/55 |
| 8,961,366 B2* | 2/2015 | Furuya | B60W 20/10 477/180 |
| 9,053,651 B2* | 6/2015 | Yeo | G09G 5/00 |
| 9,391,922 B2* | 7/2016 | Herington | G06F 1/3203 |
| 9,786,247 B2* | 10/2017 | Hong | G09G 5/003 |
| 9,812,926 B1* | 11/2017 | Rodriguez | F03D 9/00 |
| 9,823,715 B1* | 11/2017 | Roy | H05K 7/20745 |
| 9,912,160 B2* | 3/2018 | Reineccius | H02J 3/383 |
| 2002/0073941 A1 | 6/2002 | Lehman | |
| 2005/0060590 A1* | 3/2005 | Bradley | G06F 1/3203 713/320 |
| 2005/0173925 A1* | 8/2005 | Farkas | F01K 13/00 290/1 A |
| 2006/0066104 A1* | 3/2006 | Melfi | H02J 9/066 290/1 A |
| 2006/0137355 A1* | 6/2006 | Welch | B64D 41/007 60/772 |
| 2007/0278071 A1* | 12/2007 | Flegel | H01H 9/26 200/50.33 |
| 2007/0296276 A1* | 12/2007 | Blackman | H02J 5/00 307/64 |
| 2009/0072624 A1* | 3/2009 | Towada | G06F 11/2015 307/65 |
| 2009/0117843 A1* | 5/2009 | Palmer | F24F 7/06 454/239 |
| 2010/0052604 A1* | 3/2010 | Sun | H02J 7/32 320/101 |
| 2010/0057625 A1* | 3/2010 | Boss | G06Q 30/0206 705/80 |
| 2011/0049892 A1* | 3/2011 | Ross | H02K 53/00 290/50 |
| 2011/0077795 A1* | 3/2011 | VanGilder | G06F 1/206 700/300 |
| 2011/0173470 A1* | 7/2011 | Tran | G06F 1/26 713/323 |
| 2011/0188189 A1* | 8/2011 | Park | G05B 11/01 361/679.05 |
| 2011/0196542 A1* | 8/2011 | Pinkerton | G06F 1/30 700/287 |
| 2011/0239010 A1* | 9/2011 | Jain | G06F 1/3209 713/310 |
| 2012/0283890 A1* | 11/2012 | Fu | H02J 3/14 700/295 |
| 2013/0007515 A1* | 1/2013 | Shaw | G06F 1/30 714/14 |
| 2013/0049473 A1* | 2/2013 | Brech | H02J 9/08 307/68 |
| 2013/0286462 A1* | 10/2013 | Yeo | G09G 5/00 359/291 |
| 2014/0015743 A1* | 1/2014 | Seo | G06F 1/1694 345/156 |
| 2014/0067320 A1* | 3/2014 | Lee | G01B 21/20 702/167 |
| 2014/0083656 A1* | 3/2014 | Kaler | H02K 7/025 165/121 |
| 2014/0098075 A1* | 4/2014 | Kwak | G06F 3/0487 345/204 |
| 2014/0208129 A1* | 7/2014 | Morales | G06F 1/30 713/300 |
| 2014/0320393 A1* | 10/2014 | Modarres | G06F 3/017 345/156 |
| 2015/0171662 A1* | 6/2015 | Lathrop | H02J 9/066 307/64 |
| 2015/0187325 A1* | 7/2015 | Yeo | H04N 5/4403 345/156 |
| 2015/0195926 A1* | 7/2015 | Kandur Raja | G06F 1/1605 348/373 |
| 2015/0227397 A1* | 8/2015 | Gogula | G06F 9/5094 718/104 |
| 2015/0229162 A1* | 8/2015 | Gottfried | H02J 9/066 307/65 |
| 2015/0256019 A1* | 9/2015 | Pate | H02J 7/0068 307/48 |
| 2016/0028649 A1* | 1/2016 | Herington | G06F 1/3203 709/226 |
| 2016/0084257 A1* | 3/2016 | David | F04D 25/166 361/679.47 |
| 2016/0088764 A1* | 3/2016 | David | F04D 25/166 361/679.48 |
| 2016/0091235 A1* | 3/2016 | Umehara | F24F 1/24 62/160 |
| 2016/0109916 A1* | 4/2016 | Li | H02J 9/062 700/295 |
| 2016/0170626 A1* | 6/2016 | Fadell | G05D 23/1902 715/727 |
| 2016/0197534 A1* | 7/2016 | Walker | H02K 7/1823 290/52 |
| 2016/0236693 A1* | 8/2016 | Hawkins | B61C 17/06 |
| 2016/0259430 A1* | 9/2016 | Hong | G09G 5/003 |
| 2016/0270208 A1* | 9/2016 | Bostick | H05K 5/0217 |
| 2016/0344190 A1* | 11/2016 | Reineccius | H02J 3/383 |
| 2016/0360650 A1* | 12/2016 | David | F04D 25/166 |
| 2017/0060248 A1* | 3/2017 | Modarres | G06F 3/017 |
| 2017/0086333 A1* | 3/2017 | Roy | G06F 1/20 |
| 2017/0102738 A1* | 4/2017 | Park | G06F 1/1652 |
| 2017/0179724 A1* | 6/2017 | Lam | H02J 9/062 |
| 2017/0185106 A1* | 6/2017 | Baldwin | G06F 1/1626 |
| 2017/0223874 A1* | 8/2017 | Roy | H05K 7/20827 |
| 2017/0339804 A1* | 11/2017 | Ingalz | H02M 1/4208 |
| 2018/0017280 A1* | 1/2018 | Tanabe | F24F 11/30 |
| 2018/0039525 A1* | 2/2018 | Boss | G06F 9/5011 |
| 2018/0101215 A1* | 4/2018 | Mahindru | G06F 1/329 |
| 2018/0107255 A1* | 4/2018 | Roy | H05K 7/20745 |
| 2018/0116070 A1* | 4/2018 | Broadbent | H05K 7/1492 |
| 2018/0138741 A1* | 5/2018 | Veltri | H02J 9/066 |
| 2018/0139869 A1* | 5/2018 | Roy | G06F 1/20 |

* cited by examiner

INTEGRATED ENERGY STORAGE SYSTEMS IN COMPUTING FACILITIES

BACKGROUND

Large computing facilities such as datacenters typically include a distributed computing system housed in large buildings, containers, or other suitable enclosures. The distributed computing system can contain thousands if not millions of servers interconnected by routers, switches, bridges, and other network devices. The individual servers can host one or more virtual machines or other types of virtualized components. The virtual machines can execute applications to provide cloud or other suitable types of computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

For proper operation of servers and other electronic components, datacenters typically include a heating, ventilation, and air conditioning ("HVAC") system to maintain the buildings or enclosures at certain temperature and/or humidity levels. For example, the HVAC system can include cooling towers, chillers, fans, heat exchangers, temperature controllers, humidity controllers, air dampers, louvers, and/or other suitable components configured to provide a cooling fluid to the buildings or enclosures. The cooling fluid can then carry away heat generated by the servers during operation. Example cooling fluids can include cooling air or chilled air. By adjusting an amount of the cooling fluid provided to the buildings, the HVAC system can provide suitable operating environment to the servers in the distributed computing system.

In addition, to ensure certain levels of availability and/or reliability of provided computing services, datacenters can also include backup power systems configured to provide emergency power when a main power source (e.g., a utility power grid) is unavailable. Example backup power systems can include uninterrupted power supplies, diesel generators, and other suitable energy storage facilities. When a main power source experiences voltage instability, failure, or other operational issues, the backup power system can discharge stored energy (e.g., from the batteries) to provide emergency power to the distributed computing system. The emergency power allows servers to continue to execute assigned tasks and thus provide uninterrupted cloud computing services to the users.

Installing and maintaining such backup power systems can be costly and inefficient in storing energy. For example, uninterrupted power supplies typically include banks of batteries that are expensive to acquire, maintain, and replace. Such batteries typically need to be housed in enclosures constructed to accommodate electrical components. For instance, the enclosure may include one or more NEMA 4× containers designed against ingress of solid foreign objects and ingress of water. The enclosures also need to be equipped to handle hazardous material spills because the batteries can leak acidic or other waste solutions. In addition, after five or six years after installation, the batteries may require replacement because an ability of the batteries to hold charges diminishes over time. As such, storing energy in batteries can be inefficient. In another example, diesel generators can require costly foundations to install and periodic start/stop to test for functioning when the diesel generators are on standby.

Several embodiments of the disclosed technology can address at least some of the foregoing drawbacks related to backup power systems by integrating energy storage facilities with components of an HVAC system designed to heat, cool, or otherwise adjusting one or more environmental parameters related to the distributed computing system. In certain embodiments, the HVAC system can include an air mover (e.g., a fan, a blower, or compressor) with increased inertia and mechanically coupled to a motor-generator. To increase inertia, in one example, blades of a fan in the HVAC system can be constructed from stainless steel, bronze, or other suitable metals or metal alloys with a density of about 5,000 kg/m$^3$ or other suitable density values. In other examples, the air mover and/or the motor-generator can be coupled to a flywheel with or without a clutch for engaging or disengaging the air mover.

During normal operation, the motor in the motor-generator can draw power from a main power source to drive the air mover. Rotations of the blades of the air mover can then provide air flow from the HVAC system to an enclosure housing the distributed computing system. Rotations of the blades of the air mover and/or flywheel can also store kinetic energy. When the main power source experiences a power issue, the blades of the air mover and/or the flywheel can continue to rotate due to inertia. The continued rotations of the air mover blades and/or the flywheel can drive the generator in the motor-generator, which acts as a brake to the blades and/or the flywheel. The generator can then convert the stored kinetic energy in the blades and/or flywheel to electrical energy, which can then be provided to the distributed computing system as emergency power.

Several embodiments of the disclosed technology can have low capital investment and operating costs of providing HVAC services and emergency power to datacenters. By integrating energy storage with components of the HVAC system, backup power systems having batteries or diesel generators can be reduced in provision size or even eliminated in certain embodiments. As such, acquisition and maintenance of expensive banks of batteries and diesel generators can be decreased or even eliminated. In addition, several embodiments of the disclosed technology can also be simpler to operate than existing backup power systems. In further embodiments, aspects of the disclosed technology can also be efficient in storing energy for emergency power because components configured to store kinetic energy may not require periodic replacement like the batteries.

DETAILED DESCRIPTION

Certain embodiments of systems, devices, components, modules, routines, and processes for providing emergency power to computing units in a distributed computing system are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-6.

As used herein, the term a "distributed computing system" generally refers to a computer network having a plurality of network devices that interconnect a plurality of servers or computing devices to one another or to external networks (e.g., the Internet). The term "network device" generally refers to a physical network device, examples of which include routers, switches, hubs, bridges, load balancers, security gateways, or firewalls. A "computing unit" generally refers to a server or other suitable types of computing device configured to implement, for instance, one or more virtual machines or other suitable virtualized components.

Also used herein, the term "heating, ventilation, and air conditioning" or "HVAC" system generally refers to a system having components suitable for providing a suitable operating environment to computing devices. In one example, an HVAC system can include one or more air movers configured to provide cooling air for cooling or ventilating an enclosure housing the computing devices. In another example, an HVAC system can also include a chiller or other suitable refrigeration equipment configured to provide chilled air or chilled water to the enclosure housing the computing devices. In further examples, an HVAC system can also include cooling towers, moisture absorbers, and/or other suitable equipment. Specific examples of HVAC system are described in more detail below with reference to FIGS. 1A-2B.

The term "air mover" generally refers to an apparatus configured to generate an air flow. Example air movers can include fans, blowers, or compressors having multiple blades configured to push, pull, or otherwise impart movement to air in order to generate an air flow. An air mover can include a single stage or multi-stage fan, blower, or compressor. One example fan suitable for generating an air flow is an adjustable propeller fan provided by Aerovent of Minneapolis, Minn. Other example air movers can include centrifugal fans/blowers, tube-axial fans, vane-axial fans, or other suitable devices.

The term "motor-generator" generally refers to an assembly having an electric motor and an electric generator mechanically coupled to one another by, for instance, a shaft. The motor of a motor-generator is configured to convert electrical energy into mechanical energy by, for instance, driving the blades of an air mover to rotate. The generator of a motor-generator is configured to convert kinetic energy, for instance, from rotation of the blades of the air mover into electrical energy. In certain embodiments, a motor-generator can also include a flywheel mechanically coupled to the shaft between the motor and the generator. A "flywheel" is a rotating mechanical device that is used to store rotational energy. A flywheel can have an inertia that resists changes in rotational speeds. An amount of energy stored in a flywheel is proportional to a square of a rotational speed of the flywheel.

To ensure certain levels of availability and/or reliability, datacenters and other types of distributed computing systems can typically include backup power systems to provide emergency power when a main power source fails. However, installing and maintaining such backup power systems can be costly and inefficient in storing energy. For example, using banks of batteries to store energy can be expensive to acquire, install, and maintain. Such batteries typically need to be housed in enclosures constructed to accommodate electrical components. In addition, after five or six years after installation, the batteries may require replacement because an ability of the batteries to hold charges diminishes over time. As such, storing energy in batteries can be inefficient.

Several embodiments of the disclosed technology can address at least some of the foregoing drawbacks by integrating energy storage facilities with components of an HVAC system designed to heat, cool, or otherwise adjusting one or more environmental parameters related to an enclosure of the distributed computing system. In certain embodiments, the HVAC system can include an air mover (e.g., a fan, a blower, or a compressor) mechanically coupled to a motor-generator. When the main power source experiences a power issue, blades of the air mover can continue to rotate due to inertia. The continued rotations of the blades can drive the generator in the motor-generator to convert the stored kinetic energy in the blades to electrical energy as emergency power to the distributed computing system. By integrating energy storage for emergency use with components of the HVAC system, backup power systems having batteries or diesel generators can be reduced in provision size or even eliminated in certain embodiments. As such, acquisition and maintenance of expensive banks of batteries and diesel generators can be decreased or even eliminated, as described below with reference to FIGS. 1A-6.

Figure 1A:
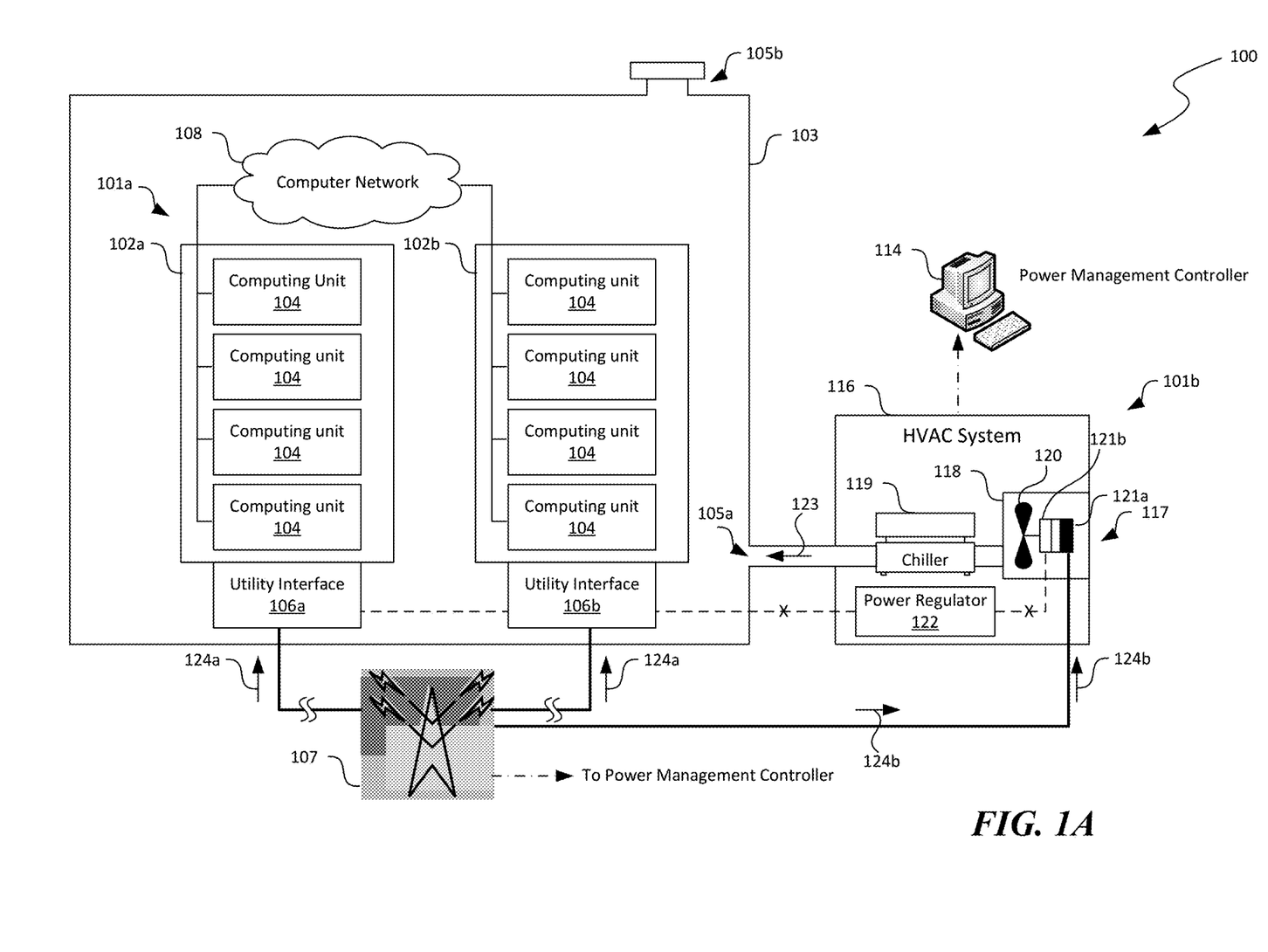
FIG. 1A is a schematic diagram of a computing facility having HVAC system with an integrated energy storage during normal operation in accordance with embodiments of the disclosed technology.

FIG. 1A is a schematic diagram of a computing facility 100 having an HVAC system with integrated energy storage during normal operation in accordance with embodiments of the disclosed technology. As shown in FIG. 1A, the computing facility 100 can include a distributed computing system 101a, an HVAC system 101b that supports the distributed computing system 101a, and a power management controller 114 in communication with both the distributed computing system 101a and the HVAC system 101b. Even though certain components of the computing facility 100 are shown in FIG. 1A, in other embodiments, the computing framework 100 can also include other suitable electrical/mechanical components in similar or different arrangements.

As shown in FIG. 1A, the distributed computing system 101a can include multiple computing units 104 coupled to one another by a computer network 108. The computing facility 100 can include one or more computer enclosures 102 (illustrated individually as first and second computer enclosures 102a and 102b, respectively) that contain the corresponding computing units 104. The computer enclosures 102 can have any suitable shape and size to house the computing units 104 in racks, drawers, and/or in other suitable arrangements. Though only two computer enclosures 102 are shown in FIG. 1A, in other embodiments, the distributed computing system 101a can include one, three, four, or any other suitable number of computer cabinets 102 and/or other types of housing components.

Also shown in FIG. 1A, the computing facility 100 can include a building, a container, or other suitable housing structure 103 that houses the computer enclosures 102. The housing structure 103 can include a cooling fluid inlet 105a coupled to the HVAC system 101b and a cooling fluid outlet 105b configured to exhaust a cooling fluid to the atmosphere, a cooling tower, or other suitable destinations. Though not shown in FIG. 1A, the computing facility 100 can also include manifolds, valves, pipes, pumps, or other suitable mechanical components configured to distribute a cooling fluid received from the HVAC system 101b via the cooling fluid inlet 105a. The cooling fluid can then carry away heat generated by the computing units 104 before being exhausted through the cooling fluid outlet 105b.

The computer network 108 can include a wired medium (e.g., twisted pair, coaxial, untwisted pair, or optic fiber), a wireless medium (e.g., terrestrial microwave, cellular systems, WI-FI, wireless LANs, Bluetooth, infrared, near field communication, ultra-wide band, or free space optics), or a combination of wired and wireless media. The computer network 108 may operate according to Ethernet, token ring, asynchronous transfer mode, and/or other suitable protocols. In further embodiments, the computer network 108 can also include routers, switches, modems, and/or other suitable computing/communications components in any suitable arrangements.

The computing units 104 can be configured to implement one or more computing applications, network communications, input/output capabilities, and/or other suitable functionalities. In certain embodiments, the computing units 104 can include web servers, application servers, database servers, and/or other suitable computing components. In other embodiments, the processing units can include routers, network switches, analog/digital input/output modules, modems, and/or other suitable electronic components. FIG. 1A shows four computing units 104 in each computer enclosure 102. In other embodiments, one, two, three, five, or any other suitable number of computing units 104 may be in each computer enclosure 102.

The computing facility 101 can be electrically coupled to a main power source 107 (e.g., a utility power grid) configured to provide electrical power to the computing units 104 during normal operation. In the illustrated embodiment, the computing facility 100 can also include utility interfaces 106 (illustrated individually as first and second utility interfaces 106a and 106b, respectively) operatively couple the main power source 107 to the computing units 104 in respective computer enclosures 102. The first and second utility interfaces 106a and 106b can be configured to convert, condition, distribute, and/or switch power, monitor for electrical faults, or otherwise interface with the main power source 107. For example, in one embodiment, the utility interfaces 106 can include a power distribution unit configured to receive electrical power from the main power source 107 and distribute the received electrical power to the individual computing units 104. In other embodiments, the utility interfaces 106 can include a power conversion unit (e.g., a transformer), a power conditioning unit (e.g., a rectifier, a filter, etc.), a power switching unit (e.g., an automatic transfer switch), a power protection unit (e.g., a surge protection circuit or a circuit breaker), and/or other suitable electrical/mechanical components that support operation of the computing units 104.

The HVAC system 101b can be configured to provide cooling air, chilled air, or other suitable types of cooling fluid to the computing units 104 housed in the computer enclosures 102 in the housing structure 103. As shown in FIG. 1A, the HVAC system 101b can include an air mover assembly 118, a chiller 119, and a power regulator 122 operatively coupled to one another. The chiller 119 can include a refrigeration unit, a swamp cooler, or other suitable components configured to reduce a temperature of air moving through the chiller 119. The power regulator 122 can include rectifiers, filters, or other suitable electrical components configured to rectify, filter, switch, or otherwise affect electrical power generated by the motor-generator 117. Particular components and arrangements of the HVAC system 101b are shown in FIG. 1A for illustration purposes. In other embodiments, the HVAC system 101b can also include a cooling tower, heat exchangers, mufflers, or other suitable components.

As shown in FIG. 1A, the air mover assembly 118 can include an air mover 120 operatively coupled to a motor-generator 117. Though not shown in FIG. 1A, the air mover assembly 118 can also include an air filter, inlet guide vane, isolation valves, or other suitable mechanical/electrical components. In further embodiments, the HVAC system 101b can also include one or more sensors and controllers configured to maintain an environmental parameter (e.g., temperature, humidity, etc.) in the housing structure 103 and/or the computer enclosures 102 at or near a set point.

The air mover 120 can include a fan, a blower, or a compressor having one or more blades configured to push, pull, or otherwise impart movement to air. In certain embodiments, the blades of the air mover 120 can have certain levels of inertia by increasing a weight of the blades. For example, the blades can be constructed from stainless steel, bronze, or other suitable metals or metal alloys with a density of about 5,000 kg/m$^3$ or other suitable density values. In other embodiments, the inertia of the air mover 120 can be increased by incorporating a flywheel, as described in more detail below with reference to FIGS. 3B and 3C.

In the illustrated embodiment, the motor-generator 117 includes an electric motor 121a and an electric generator 121b mechanically coupled to each other by a shaft, gears, or pinions (not shown). In other embodiments, the electric motor 121a and the electric generator 121b can be integrated into a single entity, such as a dynamotor. The electric motor 121a can be electrically coupled to the main power source 107 to receive electrical power from, for instance, a utility power grid. The electric motor 121a can include an induction or other suitable types of motor that is configured to convert electrical power received from the main power source 107 into rotational or other suitable kinetic energy. A drive shaft or drive gear (not shown) can then transfer the kinetic energy to the blades of the air mover 120, and thus causing the blades to rotate (shown in FIG. 1A as filled blades). The rotating blades of the air mover 120 can then force air to flow into the housing structure 103 via the chiller 119.

The generator 121b can be configured convert mechanical energy into electrical energy. In one example, the electric motor 121a can impart mechanical energy to the generator 121b via a shaft. In turn, the electric motor 121 can convert the received mechanical energy into electrical energy. As shown in FIG. 1A, the electric generator 121b can have an output coupled to the utility interfaces 106. As described in more detail below with reference to FIG. 1B, rotating blades of the air mover 120 or other inertia components (e.g., a flywheel) of the air mover assembly 118 can drive the electric generator 121b to generate electrical energy when the main power source 107 experiences a failure or other power issues. The generated electrical energy can then be provided as emergency power to the computing units 104 via the utility interfaces 106.

The power management controller 114 can be configured to monitor and manage power operations related to the computing units 104. For example, the power management controller 114 can be configured to monitor a status of the main power source 107 and determine whether the main power source 107 has experienced voltage instability, failure, or other issues. In another example, the power management controller 114 can also be configured to monitor a remaining portion of energy stored in the HVAC system and determine whether to adjust operations performed by the computing units 104, as described in more detail below with reference to FIG. 1B. Though the power management controller 114 is shown in FIG. 1A and other figures herein as an independent computing device, in other embodiments, the power management controller 114 can also include a computing service provided by, for instance, a virtual machine (not shown) hosted on one or more of the computing units 104.

FIG. 1A illustrates a normal operating condition when the main power source 107 is available. As indicated by the arrows 124a, the main power source 107 can provide electrical energy to the computing units 104 via the utility interfaces 106. The main power source 107 also provides electrical power (as indicated by arrows 124b) to the motor 121a of the motor-generator 107. The motor 121a can then convert the received electrical energy into mechanical energy to rotate the blades of the air mover 120. As such, the blades of the air mover 120 can force air to flow from, for example, an air inlet, through the chiller 119, and into the housing structure 103, as indicated by the arrow 123. Rotation of the blades and/or other inertia components of the air mover assembly 118 can then store energy as rotational energy in the HVAC system 101b.

Figure 1B:
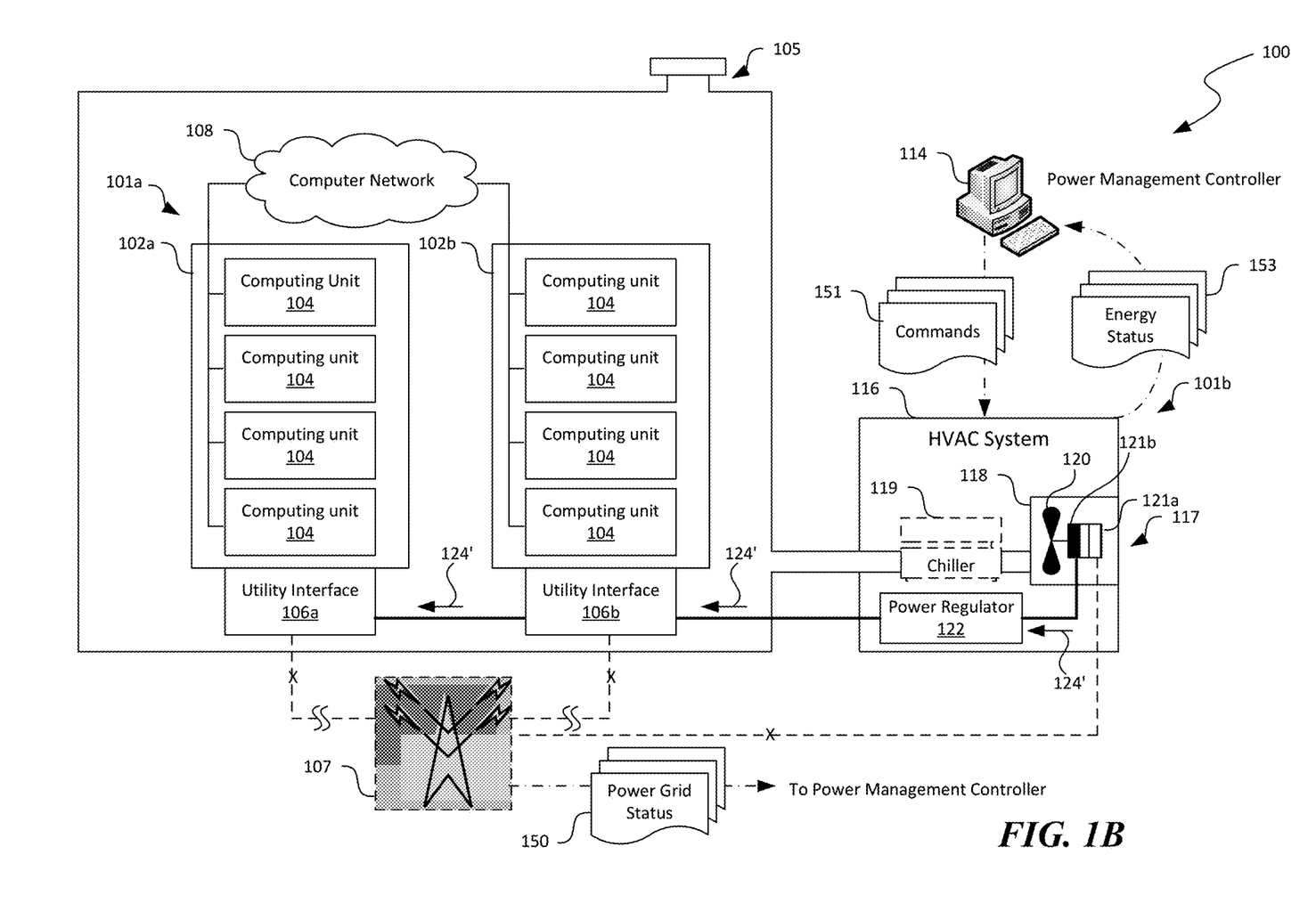
FIG. 1B is a schematic diagram of the computing facility of FIG. 1A during a failure of a main power source in accordance with embodiments of the disclosed technology.

FIG. 1B illustrates an emergency operating condition when the main power source is unavailable due to voltage instability, failure, or other reasons. As shown in FIG. 1B, the main power source 107 can transmit data representing a power grid status 150 to the power management controller 114. In certain embodiments, the power grid status 150 can include data indicating that the main power source 107 has failed. In other embodiments, the power grid status 150 can include data indicating a current supply voltage, a current phasor measurement, or other suitable types of parameter of the supplied power from the main power source 107. In response to receiving the power grid status 150, the power management controller 114 can determine whether to instruct the received power grid status 150. For example, when the power grid status 150 is indicating that the main power source 107 has failed, or drooping of the voltage of the supplied power has exceeded a preset threshold, the power management controller 114 can instruct the HVAC system 101b to provide emergency power to the computing units 104 by transmitting commands 151 via, for example, the computer network 108. In turn, the HVAC system 101b can utilize the generator 121b to convert the stored rotational energy in the blades of the air mover 120 into electrical energy. As indicated by the arrows 124', the power regulator 122 can be switched to electrically couple an output from the generator 121b with the computing units 104 via the utility interface 106b. Thus, the generator 121b can provide the generated electrical energy as emergency power to the computing units 104 via the power regulator 122. Optionally, the HVAC system 101b can also shut down the chiller 119 (shown in phantom lines for clarity) and/or other components of the HVAC system 101b.

In certain implementations, the HVAC system 101b can also provide energy status data 153 regarding a current amount of stored energy in the HVAC system 101b to the power management system 114. For example, the HVAC system 101b can provide a current speed of rotation of the blades to the power management controller 114. In response, the power management controller 114 can determine an energy amount associated with the blades at a corresponding weight and speed of rotation. The power management controller 114 can then determine whether the current amount of stored energy is below a threshold. In response to determining that the current amount of stored energy is below the threshold, the power management controller 114 can cause adjustments in operations of the computing units 104 by, for example, requesting migration of virtual machines hosted on the computing units 104 to other computing units not affected by the outage of the main power source 107; introducing another backup power source (e.g., a diesel generator or an axillary power line); or shutting down one or more of the computing units 104. In other implementations, the HVAC system 101b can also provide the power management controller 114 with the energy status data 153 indicating a remaining period of operation by the generator 121b to power the computing units 104 or other suitable capacity information.

Figure 2A:
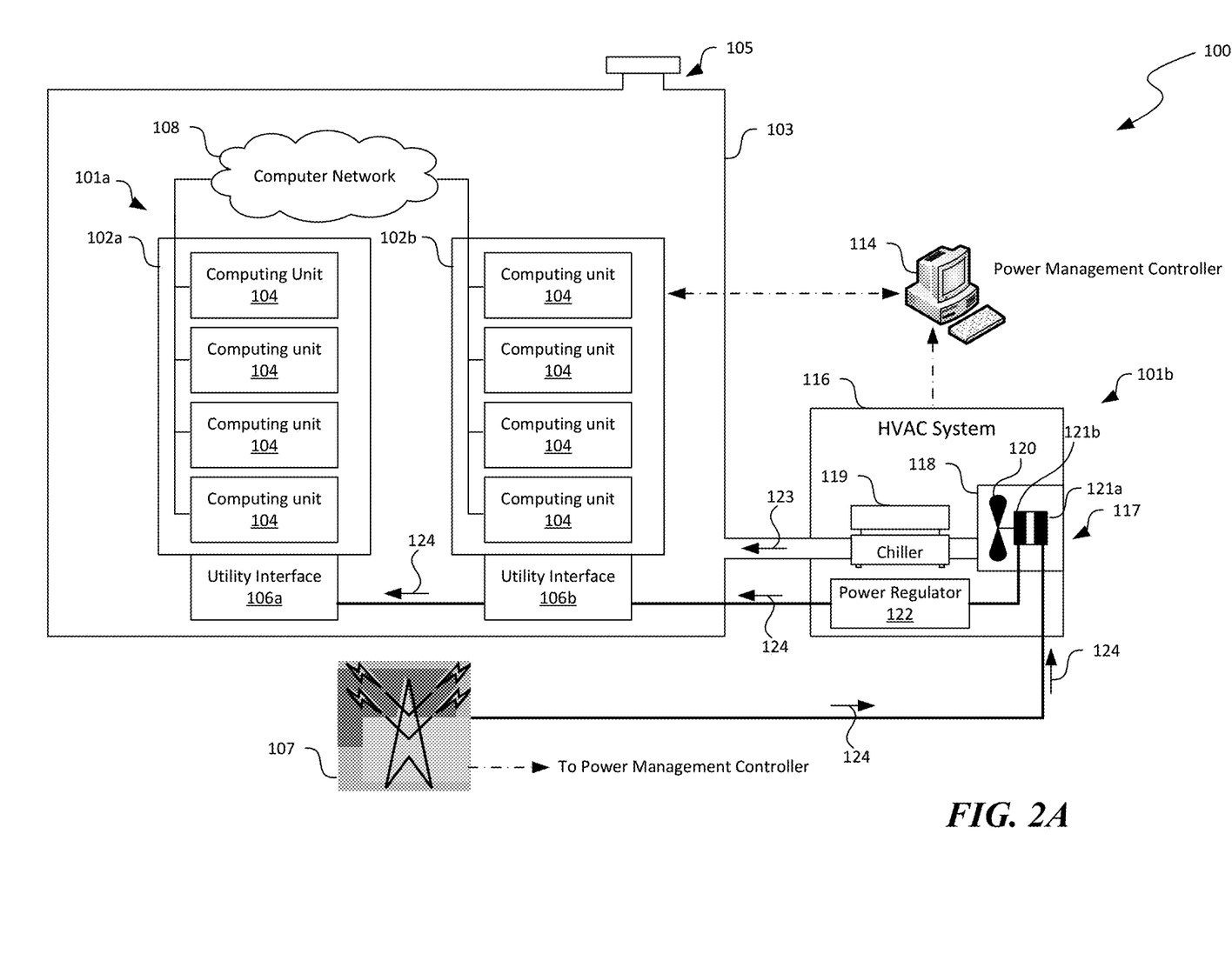
FIG. 2A is a schematic diagram of a computing facility having an HVAC system with an integrated energy storage during normal operation in accordance with additional embodiments of the disclosed technology.
Figure 2B:
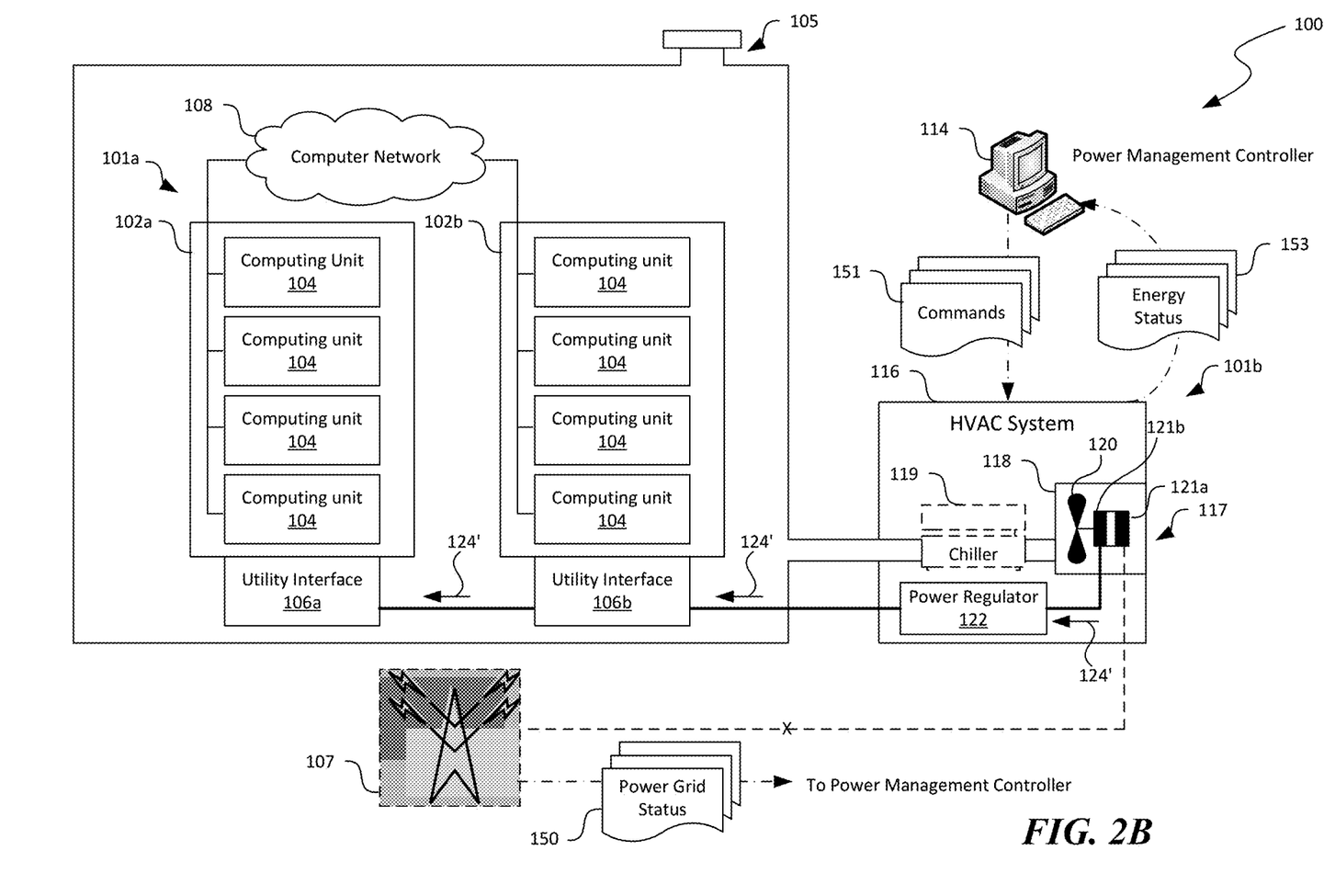
FIG. 2B is a schematic diagram of the computing facility of FIG. 2A during a failure of a main power source in accordance with additional embodiments of the disclosed technology.

FIGS. 2A and 2B are schematic diagrams illustrating the computing facility 100 having a different electrical connectivity than that shown in FIGS. 1A and 1B but under similar operational conditions, respectively. Unlike in FIGS. 1A and 1B in which the main power source 107 provides electrical energy directly to the computing units 104 via the utility interfaces 106, as shown in FIGS. 2A and 2B, the computing units 104 receive electrical power from the generator 121b both when the main power source 107 is available and when the main power source 107 experiences operating issues. For example, as shown in FIG. 2A, during normal operation, the main power source 107 provides electrical power to the motor 121a of the motor-generator 117, as indicated by the arrows 124. The motor 121a converts the received electrical energy into mechanical energy to drive both the blades of the air mover 120 and the generator 121b. The generator 121b then converts the received mechanical energy into electrical energy and provides the electrical energy to the computing units 104 via the utility interface 106 and the power regulator 122.

As shown in FIG. 2B, when the main power source 107 experiences an operating issue, electrical energy provided to the motor 121a is discontinued. However, the generator 121b can continue to provide electrical energy to the computing units 104, as indicated by the arrows 124', by converting rotational energy stored in the blades of the air mover 120 and/or other inertia components of the air mover assembly 118. Several embodiments of the disclosed technology as shown in FIGS. 2A and 2B can be simpler to implement because source switching components (e.g., automatic transfer switches) may be omitted from the utility interfaces 106. In addition, the continuous operation of the generator 121b can reduce if not avoid any interruption of electrical power provided to the computing units 104.

Figure 3A:
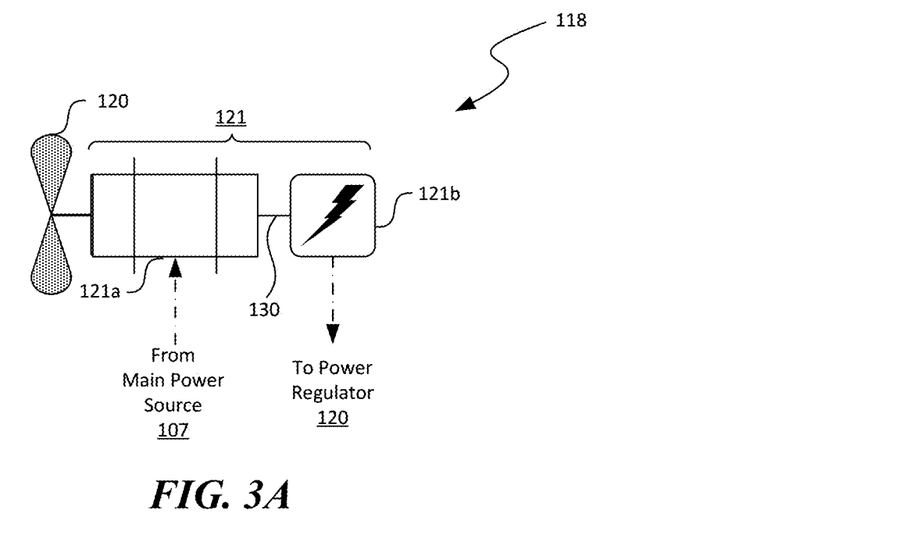
FIGS. 3A-3D are schematic diagrams illustrating certain components and configurations of an air mover assembly suitable for the HVAC system in FIG. 1 in accordance with embodiments of the disclosed technology.

FIGS. 3A-3D are schematic diagrams illustrating certain components and configurations of an air mover assembly 118 suitable for the HVAC system in FIG. 1 in accordance with embodiments of the disclosed technology. As shown in FIG. 3A, in certain embodiments, the air mover assembly 118 can include blades of an air mover 120 mechanically coupled to a motor 121a and a generator 121b of a motor-generator 121. A shaft 130 can couple the motor 121a and the generator 121b.

In the illustrated embodiment, the blades of the air mover 120 can have high inertia by, for example, being constructed from stainless steel, bronze, or other suitable metals or metal alloys with a density of about 5,000 kg/m$^3$ or other suitable density values. In other embodiments, the air mover 120 can include a high number (e.g., 10, 12, or 14) blades. In further embodiments, the air mover assembly 118 can include additional inertia components, as described in more detail below with reference to FIGS. 3B and 3D.

Figure 3B:
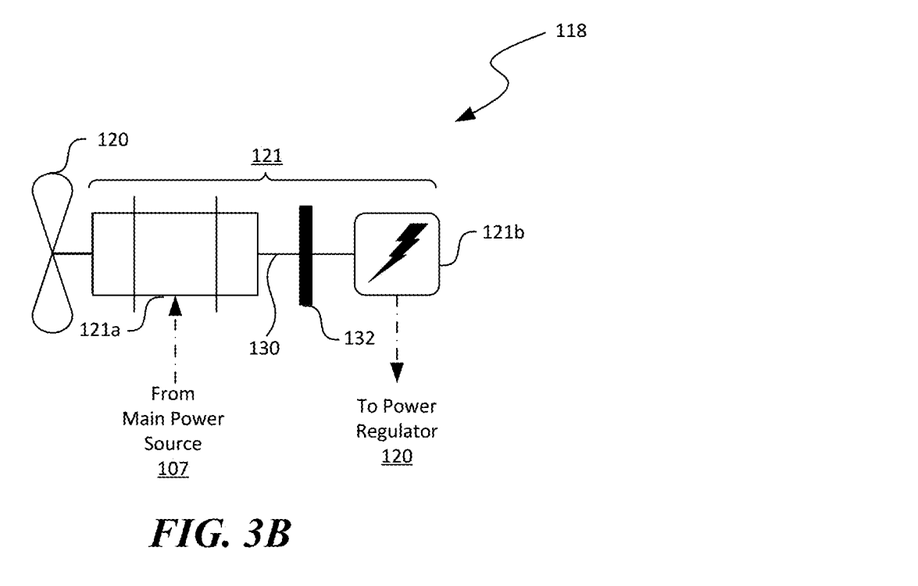

As shown in FIG. 3B, the air mover assembly 118 can also include a flywheel 132. In the illustrated embodiment, the flywheel 132 is coupled to the shaft 130 between the motor 121a and the generator 121b. In other embodiments, the flywheel 132 can be coupled to the shaft between the blades of the air mover 120 or at other suitable locations. During normal operation, the motor 121a receives electrical power from the main power source 107 and converts the received electrical power into mechanical energy to impart rotation on the flywheel 132 via the shaft 130. When the main power source 107 experiences a failure, the flywheel 132 continues to rotate due to inertia. The generator 121b can then convert the stored rotational energy into electrical energy by acting as a brake for the flywheel 132.

Figure 3C:
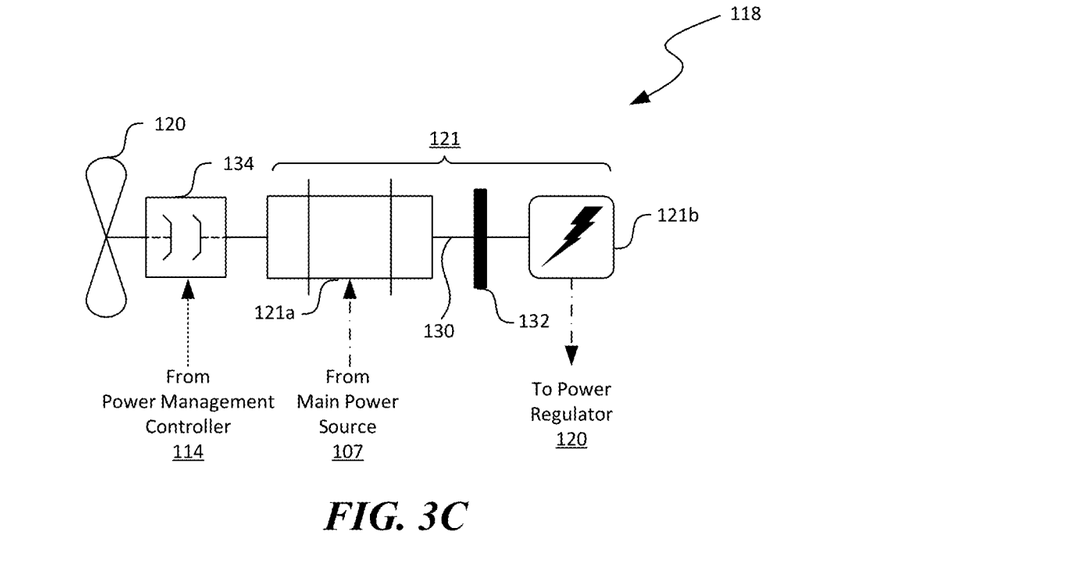

FIG. 3C shows further embodiments of the air mover assembly 118 in which a clutch 134 is incorporated to engage/disengage the blades of the air mover 120 from the motor 121a of the motor-generator 121. As shown in FIG. 3C, during normal operation, the clutch 134 can engage the blades of the air mover 120 with the motor 121a. The motor 121a can drive the blades to rotate by drawing electrical power from the main power source 107. When the main power source 107 (FIG. 1A) experiences a failure or other operational issues, the clutch 134 can disengage, for example, based on a signal from the power management controller 114, the blades of the air mover 120 from the motor 121a. As such, the flywheel 132 can continue to rotate without being slowed down by the rotating blades of the air mover 120.

Figure 3D:
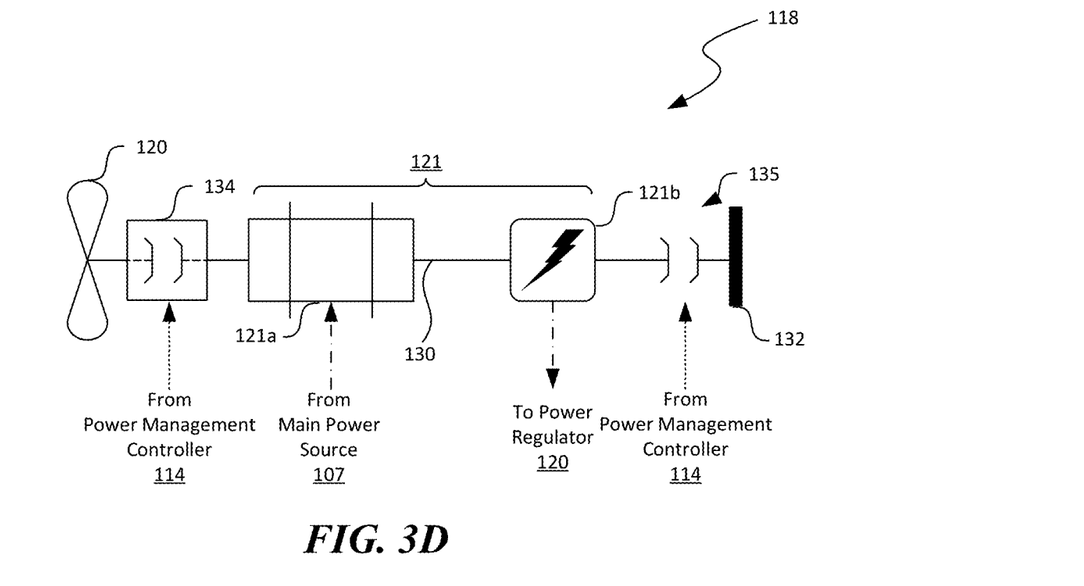

FIG. 3D shows further embodiments of the air mover assembly 118 in which a coupling 135 is incorporated to engage/disengage the flywheel 132 from the motor 121a of the motor-generator 121. The coupling 135 can include a friction, magnetic, or other suitable types of coupling. As shown in FIG. 3D, during normal operation, the coupling 135 can engage the flywheel 132 to the shaft 130 such that the motor 121b can drive the flywheel 132 to spin at a target rotational speed. When the main power source 107 (FIG. 1A) experiences a failure or other operational issues, the generator 121a can convert kinetic energy stored in the flywheel 132 to emergency power, as described above with reference to FIGS. 2A-2B. Once any stored kinetic energy in the flywheel 132 is spent, the power management controller 114 can issue instructions to the coupling 135 to disengage the flywheel 132 from the motor-generator 121. In further embodiments, the power management controller 114 can also control the clutch 134 to slow down rotation of the fan 120 such that more energy from the flywheel 132 can be converted into electrical energy. In yet further embodiments, aspects of the several embodiments of the air mover assembly 118 shown in FIGS. 3A-3D can be combined in suitable ways.

Figure 4:
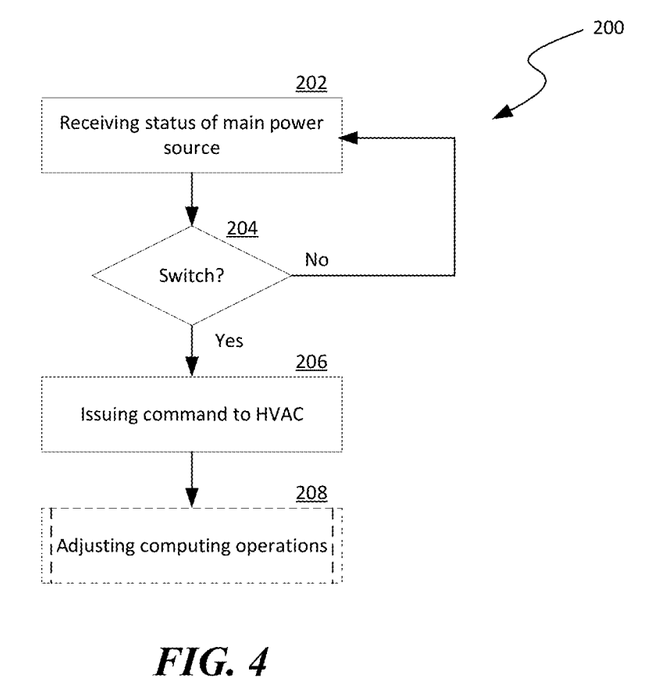
FIGS. 4 and 5 are flowcharts illustrating various processes of providing emergency power in accordance with embodiments of the disclosed technology.

FIG. 4 is a flowchart illustrating various processes of providing emergency power to computing units in a distributed computing system in accordance with embodiments of the disclosed technology. As shown in FIG. 4, the process 200 can include receiving data representing a status of a main power source at stage 202. The data can indicate whether the main power source is operating normally, failed, or experiencing voltage instability or other suitable conditions. The process 200 can then include a decision stage 204 to determine whether to switch power sources. In response to determining that the main power source is operating normally, the process 200 reverts to receiving status of the main power source at stage 202. In response to determining that the main power source has failed or otherwise operating abnormally, the process 200 can include issuing instructions to an HVAC system to provide emergency power to computing units 104 in the distributed computing system. The process 200 can optionally include adjusting computing operations by the computing units 104 based on a current amount of stored energy in the HVAC system at stage 208. Example operations of adjusting computing operations are described below with reference to FIG. 5.

Figure 5:
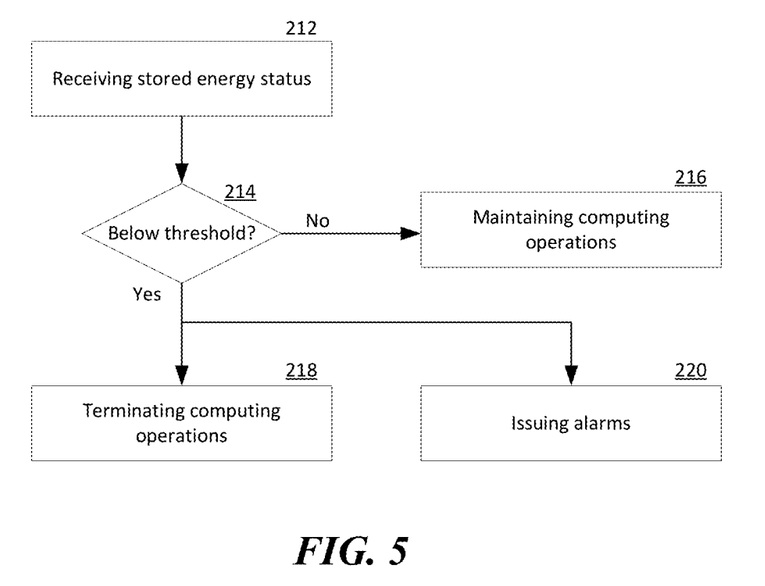

FIG. 5 is a flowchart illustrating example operations for adjusting computing operations based on an amount of stored energy in a HVAC system. As shown in FIG. 5, the operations can include receiving a stored energy status at stage 212. The stored energy status can include, for instance, a rotational speed of blades of an air mover in the HVAC system. The operations can also include a decision stage 214 to determine whether the stored energy has a value that is below a threshold. In response to determining that the stored energy has a value that is below the threshold, the operations can include terminating computing operations performed by the computing units at stage 218 and issuing an alarm to, for instance, an administrator of the distributed computing system at stage 220.

Figure 6:
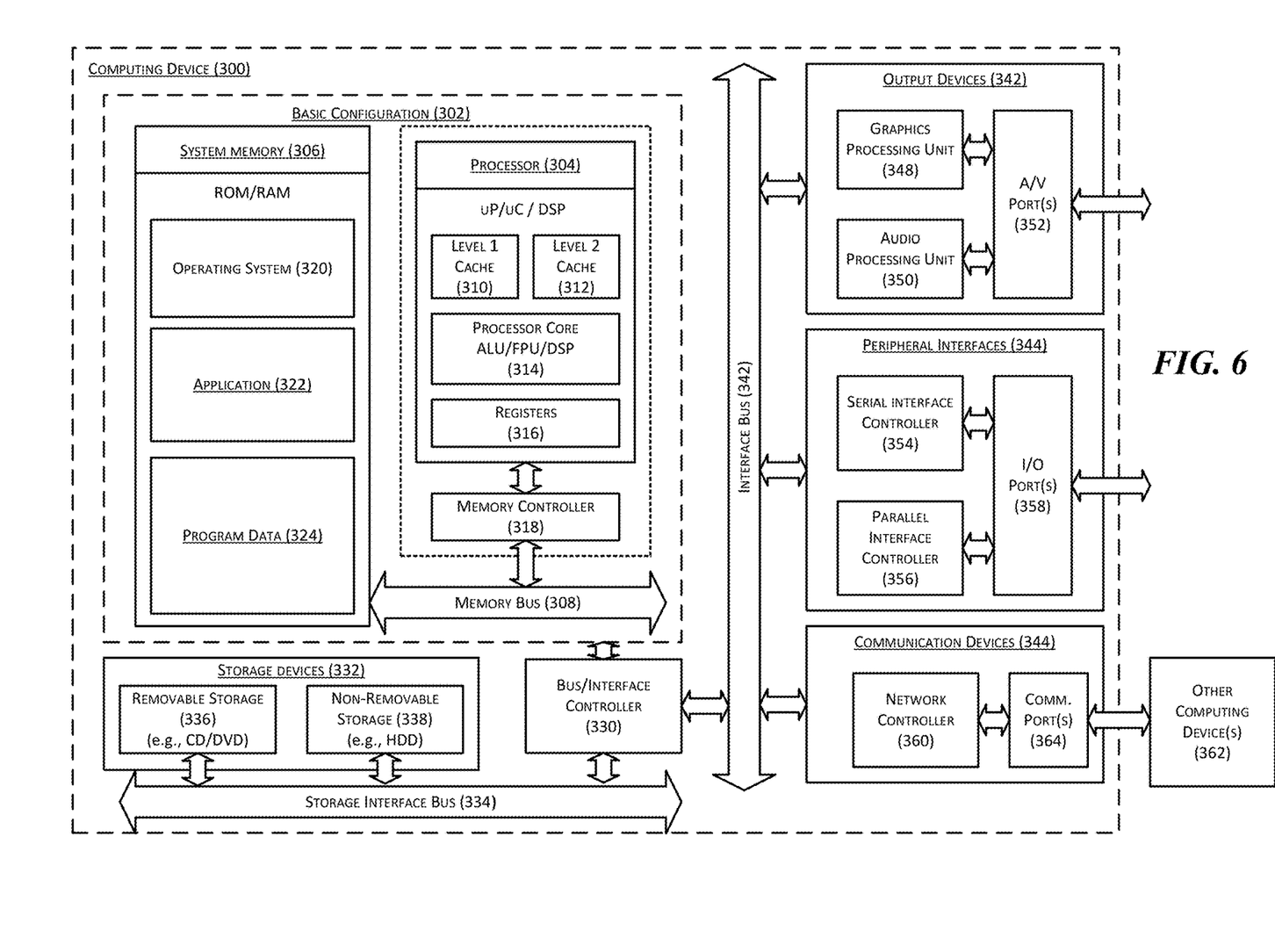
FIG. 6 is a computing device suitable for certain components of the distributed computing system in FIG. 1.

FIG. 10 is a computing device 300 suitable for certain components of the hybrid cloud computing system 100 in FIG. 1. For example, the computing device 300 can be suitable for the computing units 104 or the power management controller 114 of FIG. 1A. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof.

The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of providing emergency power to servers interconnected by a computer network, the method comprising:

receiving, via the computer network, data indicating a power failure of the main power source configured to provide electrical power to the servers via a utility interface; and in response to the received data indicating a power failure of the main power source, instructing, with a command and via the computer network, a heating, ventilation, and air conditioning ("HVAC") system to provide emergency power to the servers, the HVAC system including an air mover having blades, a motor-generator mechanically coupled to the air mover, and a power regulator operatively coupled to the motor-generator, wherein:

the motor-generator includes a motor, a generator, and a shaft mechanically coupling the motor and the generator, wherein the motor is configured to rotate the blades of the air mover thereby generating an air movement and impart mechanical energy to the generator by drawing power from the main power source;

the generator is mechanically coupled to the motor via the shaft, the generator being configured to convert kinetic energy of the rotating blades of the air mover into electrical energy; and in response to the instructed command, the power regulator is switched to electrically couple an output from the generator of the HVAC system to the servers via the same utility interface to provide the generated electrical energy from the generator as the emergency power to the servers during the power failure of the main power source.

2. The method of claim 1 wherein instructing the HVAC system to provide the emergency power includes instructing the motor of the motor-generator to disengage from the main power source and instructing the generator of the motor-generator to engage a utility interface configured to distribute the emergency power to the servers.

3. The method of claim 1 wherein:
the motor-generator also includes a shaft mechanically coupling the motor, the generator, and a flywheel between the motor and the generator; and
the generator is further configured to convert kinetic energy of the rotating blades of the air mover and the flywheel into electrical energy during a power failure of the main power source and provide the generated electrical energy as the emergency power to the servers.

4. The method of claim 3 wherein:
the air mover further includes a clutch configured to mechanically engage the blades with the motor-generator; and
the method further includes instructing the clutch to disengage the blades of the air mover from the motor-generator in response to the received data indicating a power failure of the main power source, thereby allowing the generator to convert kinetic energy of the flywheel into electrical energy.

5. The method of claim 1, further comprising:
receiving, via the computer network, data indicating an amount of emergency power available from the HVAC system;
determining whether the amount of emergency power is lower than a threshold; and
in response to determining that the amount of emergency power is lower than the threshold, adjusting computing operations in the servers.

6. The method of claim 1, further comprising:
receiving, via the computer network, data indicating an amount of emergency power available from the HVAC system;
determining whether the amount of emergency power is lower than a threshold; and
in response to determining that the amount of emergency power is lower than the threshold, migrating one or more virtual machines hosted on the servers to other servers not impacted by the power failure of the main power source.

7. The method of claim 1, further comprising:
receiving, via the computer network, data indicating an amount of emergency power available from the HVAC system;
determining whether the amount of emergency power is lower than a threshold; and
in response to determining that the amount of emergency power is lower than the threshold, persistently storing data of executed applications and subsequently, instructing the one or more of the servers to shut down.

8. The method of claim 1 wherein:
the motor-generator also includes a shaft mechanically coupling the motor and the generator;
the motor is configured to impart mechanical energy to the generator by drawing power from the main power source; and
the generator is configured to convert the imparted mechanical energy from the motor via the shaft into electrical power and provide the electrical power to the servers during normal operation.

9. The method of claim 1 wherein:
the motor-generator also includes a shaft mechanically coupling the motor and the generator;
the motor is configured to impart mechanical energy to the generator by drawing power from the main power source; and
the generator is configured to convert the imparted mechanical energy from the motor via the shaft into electrical power as electrical power to the servers during normal operation and is configured to convert the kinetic energy of the rotating blades of the air mover into electrical energy during a power failure of the main power source as the emergency power to the servers.

10. A method of providing emergency power to servers interconnected by a computer network, the method comprising:
receiving, at a heating, ventilation, and air conditioning ("HVAC") system, electrical power from a utility power grid, the HVAC system including a motor-generator mechanically coupled to drive an air mover with blades in the HVAC system and a power regulator operatively coupled to the motor-generator, wherein the motor-generator includes a motor and a generator mechanically coupled to the motor via a shaft;
rotating the blades of the air mover by utilizing the motor of the motor-generator to convert the received electrical power from the utility power grid into kinetic energy associated with rotation of the blades, thereby generating an air flow to an enclosure housing the servers and impart mechanical energy to the generator via the shaft; and
during a power failure of the utility power grid,
receiving a command instructing the HVAC system to provide emergency power to the servers;
utilizing the generator of the motor-generator to convert the kinetic energy contained in the rotating blades of the air mover into electrical energy; and
in response to receiving the command, switching the power regulator to electrically couple an output from the generator of the HVAC system to the servers to provide the generated electrical energy from the generator as emergency power to the servers, thereby allowing the servers to continue executing applications without interruption.

11. The method of claim 10 wherein:
the motor-generator also includes a shaft mechanically coupling the motor, the generator, and a flywheel between the motor and the generator;
the method further includes rotating the flywheel by utilizing the motor to convert the received electrical power from the utility power grid into additional kinetic energy; and
utilizing the generator includes utilizing the generator to convert kinetic energy of the flywheel into electrical energy during a power failure of the utility power grid.

12. The method of claim 11 wherein:
the air mover further includes a clutch configured to mechanically engage the blades with the motor-generator; and
the method further includes operating the clutch to disengage the blades of the air mover from the motor-generator during a power failure of the utility power grid, thereby allowing the generator to convert the additional kinetic energy of the flywheel into electrical energy.

13. The method of claim 10, further comprising:
determining an amount of emergency power available from the HVAC system; and
providing, via the computer network, data indicating the determined amount of emergency power available from the HVAC system.

14. The method of claim 10 wherein:
the motor-generator also includes a shaft mechanically coupling the motor and the generator;

the motor is configured to drive the generator by drawing electrical power from the utility power grid; and the generator is configured to convert the imparted mechanical energy from the motor via the shaft into electrical power and provide the electrical power to the servers during normal operation.

15. The method of claim 10 wherein:

the motor-generator also includes a shaft mechanically coupling the motor and the generator;

the motor is configured to drive the generator by drawing electrical power from the utility power grid; and the generator is configured to convert the imparted mechanical energy from the motor via the shaft into electrical power and provide the electrical power to the servers during normal operation and is configured to convert the kinetic energy of the rotating blades of the air mover into electrical energy during a power failure of the utility power grid as the emergency power to the servers.

16. A heating, ventilation, and air conditioning ("HVAC") system configured to provide heating, ventilation, and/or air conditioning to an enclosure housing multiple servers interconnected by a computer network, the HVAC system comprising:

an air mover having multiple blades, rotation of the blades generating an air flow in the enclosure housing the multiple servers;

a motor-generator mechanically coupled to the air mover to drive the blades of the air mover, the motor-generator having a motor and a generator mechanically coupled to the motor via a shaft; wherein:

the motor is configured to rotate the blades of the air mover by converting electrical power received from a utility power grid into kinetic energy associated with rotation of the blades, thereby generating the air flow and impart mechanical energy to the generator; and the generator is configured to convert the kinetic energy contained in the rotating blades of the air mover into electrical energy via the shaft; and a power regulator operatively coupled to the motor-generator, wherein the power regulator is configured to:

receive a command instructing the HVAC system to provide emergency power to the servers during a power failure of the utility power grid; and in response to receiving the command, switch an electrical connection to the servers from the utility power grid to an output from the generator of the HVAC system to provide the generated electrical energy from the generator to the servers as emergency power during the power failure of the utility power grid, thereby allowing the servers to continue executing applications without interruption.

17. The HVAC system of claim 16 wherein:

the motor-generator also includes a shaft mechanically coupling the motor, the generator, and a flywheel to one another; and the generator is further configured to convert kinetic energy of the flywheel into electrical energy during a power failure of the utility power grid and provide the generated electrical energy as the emergency power to the servers.

18. The HVAC system of claim 17 wherein the air mover further includes a clutch configured to mechanically engage the blades with the motor of the motor-generator when the utility power grid is available and disengage the blades from the motor during a power failure of the utility power grid.

19. The HVAC system of claim 16 wherein:

the motor-generator also includes a shaft mechanically coupling the motor and the generator;

the motor is configured to impart mechanical energy to the generator by drawing power from the utility power grid; and the generator is configured to convert the imparted mechanical energy from the motor via the shaft into electrical power and provide the electrical power to the servers during normal operation.

20. The HVAC system of claim 16 wherein:

the motor-generator also includes a shaft mechanically coupling the motor and the generator;

the motor is configured to impart mechanical energy to the generator by drawing power from the utility power grid; and the generator is configured to convert the imparted mechanical energy from the motor via the shaft into electrical power as electrical power to the servers when the utility power grid is available and is configured to convert the kinetic energy of the rotating blades of the air mover into electrical energy during a power failure of the utility power grid as the emergency power to the servers.

* * * * *